Figure 1:
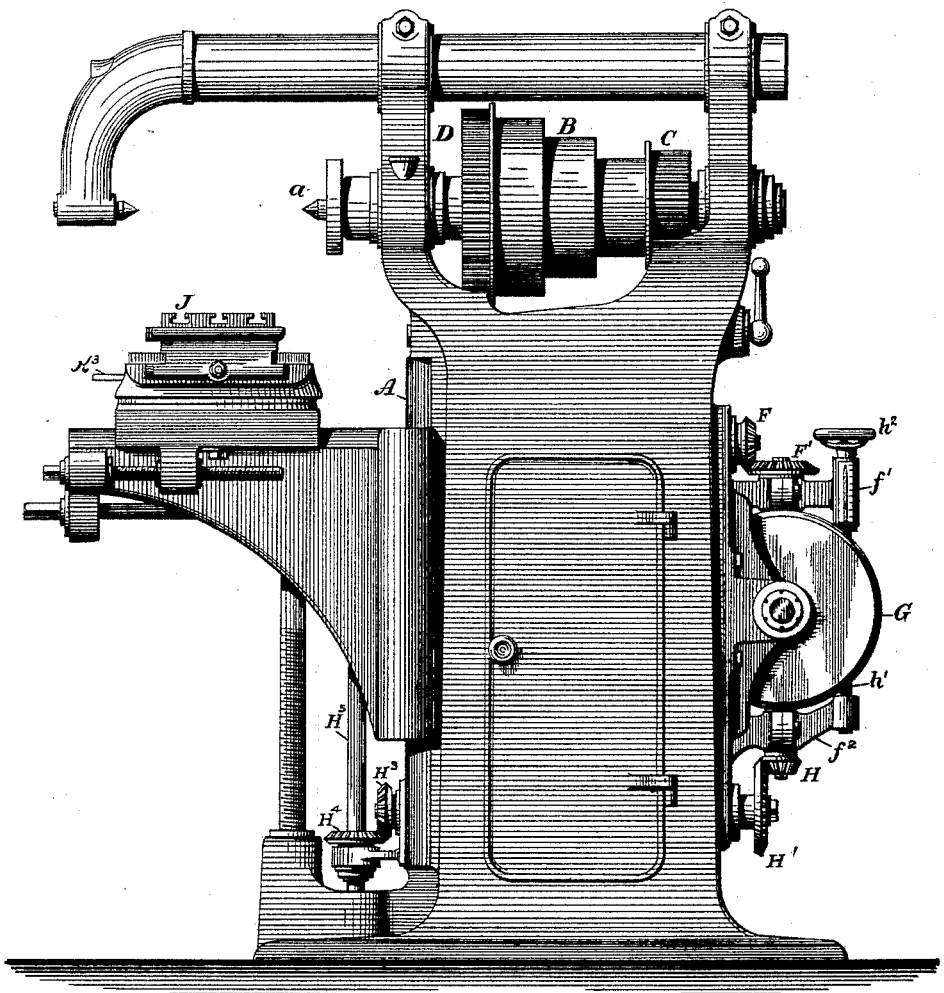

(No Model.) 3 Sheets—Sheet 1.

S. L. WORSLEY.
MILLING MACHINE.

No. 497,850. Patented May 23, 1893.

Witnesses
W. H. Thurston
S. J. Murphy

Inventor
Samuel L. Worsly (No Model.)  3 Sheets—Sheet 2.

S. L. WORSLEY.
MILLING MACHINE.

No. 497,850. Patented May 23, 1893.

Witnesses
W. H. Thurston
S. J. Murphy

Inventor
Samuel L. Worsley (No Model.) 3 Sheets—Sheet 3.
S. L. WORSLEY.
MILLING MACHINE.
No. 497,850. Patented May 23, 1893.
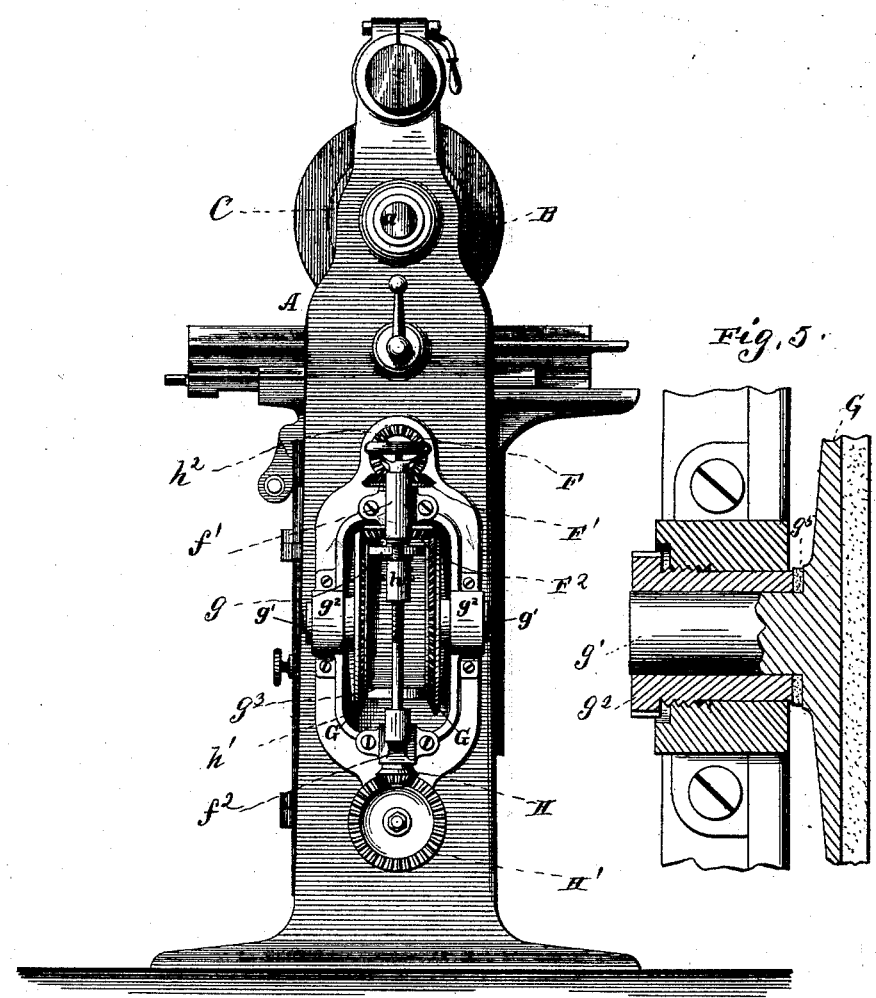
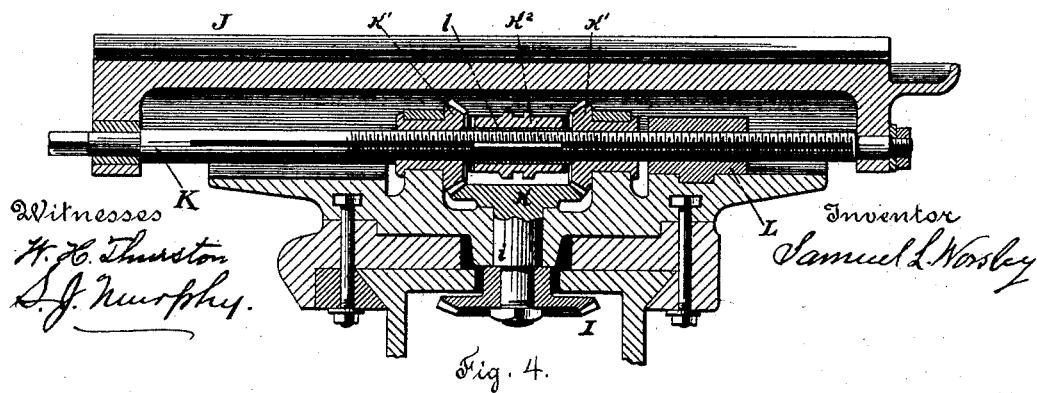
Witnesses
H. H. Thurston
S. J. Murphy
Inventor
Samuel L. Worsley

UNITED STATES PATENT OFFICE.

SAMUEL L. WORSLEY, OF TAUNTON, MASSACHUSETTS, ASSIGNOR TO THE BROWN & SHARPE MANUFACTURING COMPANY, OF PROVIDENCE, RHODE ISLAND.

MILLING-MACHINE.

SPECIFICATION forming part of Letters Patent No. 497,850, dated May 23, 1893.

Application filed June 5, 1890. Serial No. 354,318. (No model.)

*To all whom it may concern:*

Be it known that I, SAMUEL L. WORSLEY, of Taunton, in the county of Bristol and State of Massachusetts, have invented certain new and useful Improvements in Milling-Machines; and I do hereby declare the following specification, taken in connection with the accompanying drawings, forming a part of the same, to be a full, clear, and exact description thereof.

The improvements hereinafter described, although especially useful in a milling machine, are applicable to any back-geared machine for working on metal in which it is desired to secure an automatic feed for the work being operated upon. In all such back-geared machines in which the revolution of the spindle is effected by means of a train of gearing connecting with the cone-pulley to which the power is applied, there is always a difference, due to such gearing, between the speed of the cone-pulley and the speed of the spindle, the speed of the latter being comparatively slow in relation to the speed of the cone-pulley. Heretofore it has been customary to operate the work-feeding mechanism by a connection with the revolving spindle, with the result that, as the speed of such spindle is comparatively slow when in gear, it has been necessary to "gear up" to get the necessary speed for the work feeding mechanism, with consequent loss of power.

The first feature of invention consists in the combination, with the cone pulley of a milling or other back-geared machine and the work-carrying platen thereof, of mechanism connecting the two, whereby said platen may be operated directly from said cone pulley instead of from the spindle, whereby, as the speed of the cone-pulley is relatively fast, it becomes possible to "gear down" for the work-feeding mechanism, and thus obtain correspondingly increased power, and at the same time the necessary speed for the work-feeding mechanism.

Another feature of invention relates to a certain novel arrangement and combination of parts for transmitting the power to the work-feeding mechanism, whereby a greater amount of power will be transmitted, and the feed of the work be correspondingly stronger and more powerful.

Another feature of invention relates to the construction of the clutch-mechanism by means of which movement is imparted to the reciprocating work-carrying platen or carriage, whereby the double clutch-member is prevented from moving lengthwise by the revolution of the screw-shaft, and thus from prematurely stopping the movement of the platen.

Figure 2:
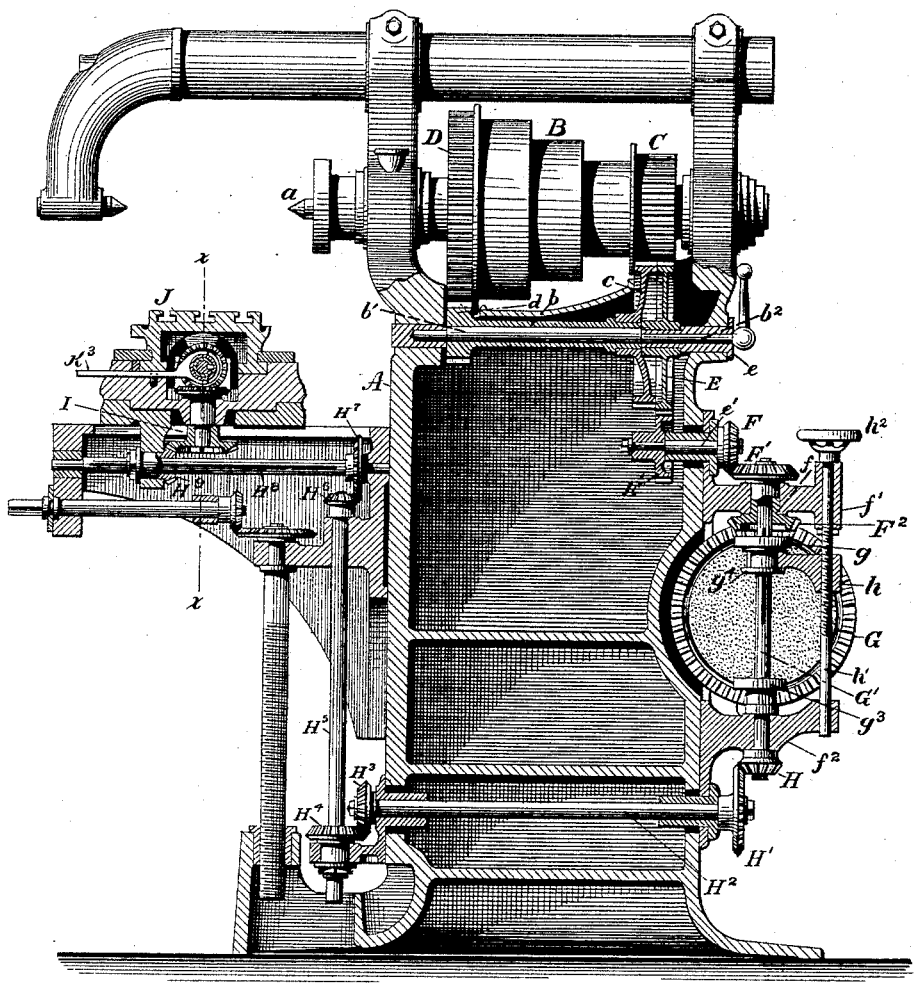

Referring to the drawings, Figure 1 is a side elevation of a milling machine embodying my improvements. Fig. 2 is a central vertical section of the same. Fig. 3 is a rear end view of the machine showing the arrangement of the double disk feed; and Fig. 4 is a longitudinal section, on an enlarged scale, taken on the line $x$, $x$, Fig. 2. Fig. 5 is a detail view on an enlarged scale.

The machine is provided with the usual frame A upon which the parts are mounted or supported. Mounted in suitable bearings in the frame is the usual spindle $a$ for rotating the milling tool.

B is a cone-pulley loosely mounted upon the spindle $a$, so as to be capable of rotation thereon as usual, and C is a spur-gear also loosely mounted upon said spindle at one end of the cone pulley, and connected to said pulley so as to rotate therewith. At the opposite end of the cone pulley is a larger spur-gear D, which is secured to the spindle so as to rotate therewith. This spur-gear D is not permanently connected with the cone-pulley, but may, when desired, be connected to said pulley by a suitable locking device as usual, and so as to thus connect the spindle $a$ with the cone-pulley so that it may be rotated directly thereby. When the spur-gear D is thus locked into connection with the cone-pulley, the speed of the spindle $a$ will of course correspond with the speed of the cone-pulley.

Arranged below the spindle $a$, and parallel with it, is the usual hollow eccentric shaft $b$ operated by the eccentric rod $b'$, and provided with the spur-gears $c$ and $d$ at its opposite ends, which engage respectively with the spur gears C and D on the spindle, so that when said eccentric shaft $b$ is turned so as to bring the gears $c$, $d$, into engagement with the gears C, D, and when the gear D is disconnected from the cone-pulley, the power from the cone-pulley will be transmitted to the spindle *a* through the gears C, *c*, *d*, D, whereby, by reason of the arrangement of said gears, the spindle will be revolved at a much slower rate of speed than the speed of the cone-pulley.

So far the arrangement of the parts is well known, and needs no further description.

The eccentric rod $b'$ is provided with a cylindrical extension $b^2$, as shown in Fig. 2. Surrounding this extension of the eccentric rod is a bushing *e* secured to the frame of the machine. Upon the inner end of this bushing is mounted another spur-gear E which meshes with the spur-gear C. Meshing with gear E is another gear E' mounted upon the inner end of a short shaft $e'$ supported in the frame-work of the machine. The other end of the shaft $e'$ is provided with a bevel gear F which meshes with another bevel gear F' secured to the upper end of a short hollow shaft *f* supported in a bracket $f'$, all as shown in Fig. 2. Upon the lower end of this hollow shaft is another bevel gear $F^2$ which meshes with two large bevel gear disk-wheels G, G, arranged upon opposite sides of the bevel gear $F^2$.

The parts G, G, which I have termed "bevel gear disk-wheels" for the sake of brevity, are merely friction disks or friction wheels, each of which is provided around its periphery with teeth or bevel gearing, as clearly shown in Figs. 2 and 3, to engage with the teeth of the bevel gear $F^2$, whereby said disk-wheels G, G, will be positively driven. The faces of these disk-wheels are preferably lined with leather, or other suitable material.

Arranged between the friction disks G, G, is a shaft G' in line with the hollow shaft *f*, and having its upper end supported for revolution in said hollow shaft *f*, and its lower end journaled in a bracket $f^2$ secured to the frame of the machine. Mounted upon the shaft G', and connected therewith by a groove and spline connection, is a friction wheel *g*. As shown in Fig. 2 this friction wheel *g* is situated directly below the bevel gear $F^2$, and consequently between the faces of the disk-wheels G, G. These disk-wheels are each provided with a short axle $g'$, $g'$, rigidly secured thereto and so as to rotate therewith, which axles are mounted in suitable bearings $g^2$, $g^2$, supported on the frame of the machine as shown at Fig. 3. The bearings $g^2$, $g^2$, are made adjustable by being screw-threaded into their supports, and the inner ends of said bearings bear against the sides of their respective disk-wheels, so that by turning these bearings in their supports the disk-wheels G, G, can be forced up into contact with the friction-wheel *g* as far as the gear-teeth on said disk-wheels will permit, and held in their proper adjusted position. Preferably a washer $g^5$ of suitable material is interposed between the end of the bearing and the said disk-wheel, as shown in Fig. 5.

In order to prevent liability of the axles of the disk-wheels G, G, becoming tilted or cramped in their bearings, another friction wheel $g^3$ is loosely mounted on the shaft G' at or near the opposite end thereof, as shown in Figs. 2 and 3. This friction wheel $g^3$ is an idler and merely serves to prevent the tilting or cramping of the disk-wheels and their axles, the power being transmitted to the shaft G' entirely by the friction wheel *g*. The friction wheel *g* is provided with a flanged collar $g^4$, with which the forked extension of a nut *h* engages. The nut *h* is mounted upon a correspondingly screw-threaded shaft $h'$, which shaft is supported in the ends of the brackets $f'$ and $f^2$, as shown in Fig. 2. By this arrangement the position of the friction wheel *g* up or down can be adjusted by turning the screw-threaded shaft $h'$, which is provided with a suitable handle $h^2$ for the purpose. By this adjustment of the friction wheel *g* the speed of the shaft G', and consequently of the work feeding mechanism can be regulated, as it will be apparent that when the friction wheel *g* engages the disk-wheels G, G, at a point farthest from their centers, the speed of the shaft G' will be greatest, and that this speed may be reduced to any degree by adjusting the friction wheel *g* toward the centers of the disk-wheels.

Upon the lower end of the shaft G' is a bevel gear H which engages with another bevel gear H' upon the end of a shaft $H^2$ mounted in suitable bearings in the frame of the machine. At the opposite end of the shaft $H^2$ is another bevel gear $H^3$ engaging with a bevel gear $H^4$ upon the lower end of an upright shaft $H^5$, likewise mounted in suitable bearings secured to the frame, all as shown in Fig. 2. The shaft $H^5$ has at its upper end another bevel gear $H^6$ meshing with a bevel gear $H^7$ upon a horizontal shaft $H^8$, which latter carries at its opposite end another bevel gear $H^9$, which in turn meshes with another bevel gear I, Figs. 2 and 4. By the train of gearing above described the power is communicated to the feeding mechanism of the work-carrying platen J, Fig. 2. This feeding mechanism is shown upon a somewhat larger scale at Fig. 4. Referring to said Fig. 4 it will be seen that the shaft *i*, upon which the bevel gear I is mounted, is provided at its upper end with another bevel gear *k*, which meshes with two bevel gears $k'$, $k'$, which surround the screw feed-shaft K and are supported so as to revolve loosely on said screw-shaft. Each of the bevel gears $k'$, $k'$, is provided with a clutch member upon its inner face. Mounted upon the screw feed-shaft K in the manner hereinafter described, and connected to said shaft by a groove and spline connection between the two bevel gears $k'$, $k'$, is a movable double clutch member $k^2$, which can be moved to engage the clutch member on one or the other of the bevel gears $k'$, $k'$, as shall be desired. This double clutch member $k^2$ is arranged to be engaged with one or the other of the bevel gears $k'$, $k'$, by hand, by means of the lever $k^3$ when it is desired to start the feed of the platen J, and to be disengaged automatically by a dog on the platen to stop the feed. The screw feed-shaft K is attached to the platen, and works in a nut L rigidly secured to the bed in the usual way.

Heretofore it has been customary to mount the double clutch-member $k^2$ directly upon the screw shaft, but it has been found in practice that when so mounted the revolution of the screw shaft in the clutch, by reason of the screw-thread thereon, has a tendency to move the double clutch-member lengthwise, and so as to disengage it from the clutch-member on the bevel gear before the time arrived to stop the movement of the platen. In other words, there was a constant liability of the double clutch-member being run out of engagement prematurely by the revolution of the screw-shaft therein. To obviate this difficulty, in the present improvement, a sleeve $l$ loosely mounted on the screw-shaft K is interposed between the two bevel gears $k'$, $k'$, said sleeve being of such a length that its ends abut against the inner faces of the bevel gears, and thus prevent said sleeve from moving lengthwise on the screw-shaft. The double clutch-member, instead of being mounted directly on the screw-shaft is mounted upon the sleeve $l$, and thus is freed from any liability to be moved lengthwise by the revolution of the screw-shaft. The sleeve $l$ is provided with a slot through which the spline extends which connects the double clutch member with the screw shaft.

The operation of the machine will be readily understood without further description. It will be seen that the arrangement of the mechanism is such that the feed of the work-carrying platen is effected through a connection with the cone-pulley, instead of from the spindle, with the result that it is possible to "gear down" and thus obtain correspondingly increased power, and at the same time maintain the necessary speed for the work-feeding mechanism.

It will be further seen that by the arrangement of the two disk-wheels, one on each side of the friction wheel to be driven thereby, the two disk wheels being each provided with and operated by bevel gearing, and driven by another bevel gear common to both disk-wheels, a greater amount of power will be transmitted, and the feed of the work be made stronger and more powerful, by reason of the employment of said two disk-wheels thus positively driven. Moreover, by the use of two disk-wheels as described, arranged on opposite sides of the friction wheel to be driven thereby, the pressure of one of said disk-wheels against said friction wheel counterbalances the pressure of the other of said disk wheels, whereby the shaft carrying the intermediate friction wheel is practically entirely relieved of friction in its bearings, thus adding still further to the amount of power transmitted for the operation of the work-feeding mechanism.

What I claim as my invention, and desire to secure by Letters Patent, is—

1. The combination, with the cone-pulley and the back gearing of a milling or other back-geared machine, of the work-carrying platen or carriage, and mechanism substantially as described for operating said platen directly from said cone-pulley, substantially as set forth.

2. The combination, with the screw feed-shaft for feeding the work-carrying platen, of two bevel gears loosely mounted thereon, and each provided upon its inner face with a clutch-member, a sleeve loosely mounted on said screw shaft between said two bevel gears and with its opposite ends abutting against the inner faces of said bevel gears, and a double clutch member mounted upon said sleeve and connected with said screw-shaft so as to revolve therewith, but so as to be capable of a longitudinal movement thereon, whereby the tendency of the double clutch-member to be moved lengthwise by the revolution of said screw-shaft will be prevented, substantially as described.

3. The combination, with the cone pulley of a milling or other machine, of the work-carrying platen or carriage, and a train of gearing connecting said platen directly with the cone pulley, said train of gearing embodying a pair of geared disk-wheels and a friction wheel located between, and adapted to be operated by, said two disk-wheels, whereby the power for actuating the work feeding mechanism will be derived directly from the cone-pulley and be transmitted through said disk-wheels and friction wheel to secure a strong and powerful feed for the work, substantially as described.

SAMUEL L. WORSLEY.

Witnesses:
W. H. THURSTON,
S. J. MURPHY.